United States Patent [19]

Weatherston

[11] Patent Number: 4,993,929
[45] Date of Patent: Feb. 19, 1991

[54] SCROLL MACHINE WITH LUBRICATED THRUST SURFACES

[75] Inventor: Roger C. Weatherston, East Amherst, N.Y.

[73] Assignee: Copeland Corporation, Sidney, Ohio

[21] Appl. No.: 416,981

[22] Filed: Oct. 4, 1989

[51] Int. Cl.$^5$ .................... F01C 1/04; F01C 21/04; F16C 32/06; F16C 33/10
[52] U.S. Cl. .................... 418/55.6; 418/88; 384/121; 384/123
[58] Field of Search .................... 418/55 E, 88, 94; 384/121, 123; 415/170.1, 171.1

[56] References Cited

U.S. PATENT DOCUMENTS

| | | | |
|---|---|---|---|
| 4,609,334 | 9/1986 | Muir et al. | 418/55 E |
| 4,762,477 | 8/1988 | Hayano et al. | 418/88 |
| 4,886,435 | 12/1989 | Sawai et al. | 418/55 E |

FOREIGN PATENT DOCUMENTS 3627579 3/1987 Fed. Rep. of Germany ........ 418/88

Primary Examiner—John J. Vrablik
Attorney, Agent, or Firm—Harness, Dickey & Pierce

[57] ABSTRACT

A scroll-type machine which incorporates a self-pressurizing hydrodynamic thrust bearing to maintain a constant interface of oil between the axial thrust surfaces.

20 Claims, 3 Drawing Sheets

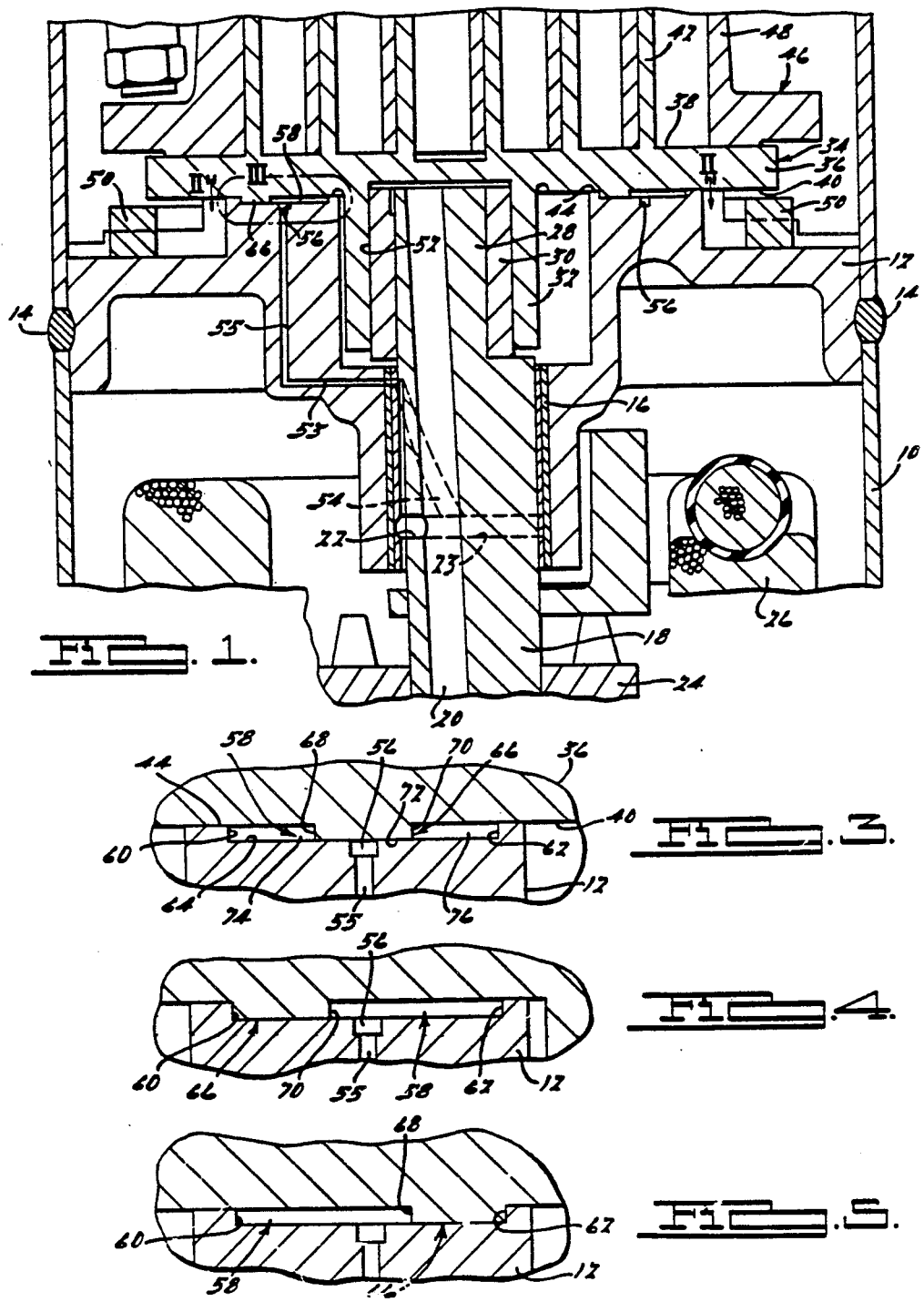

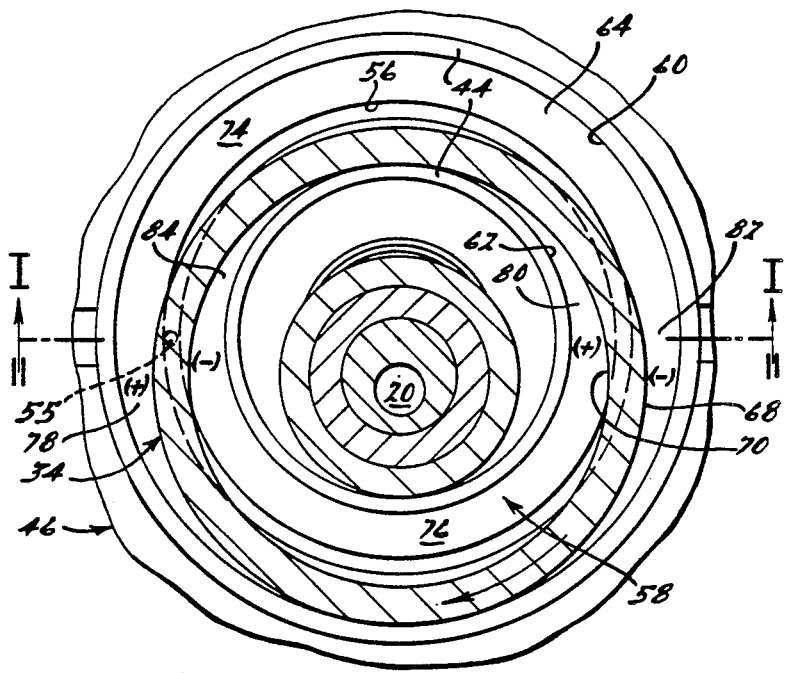

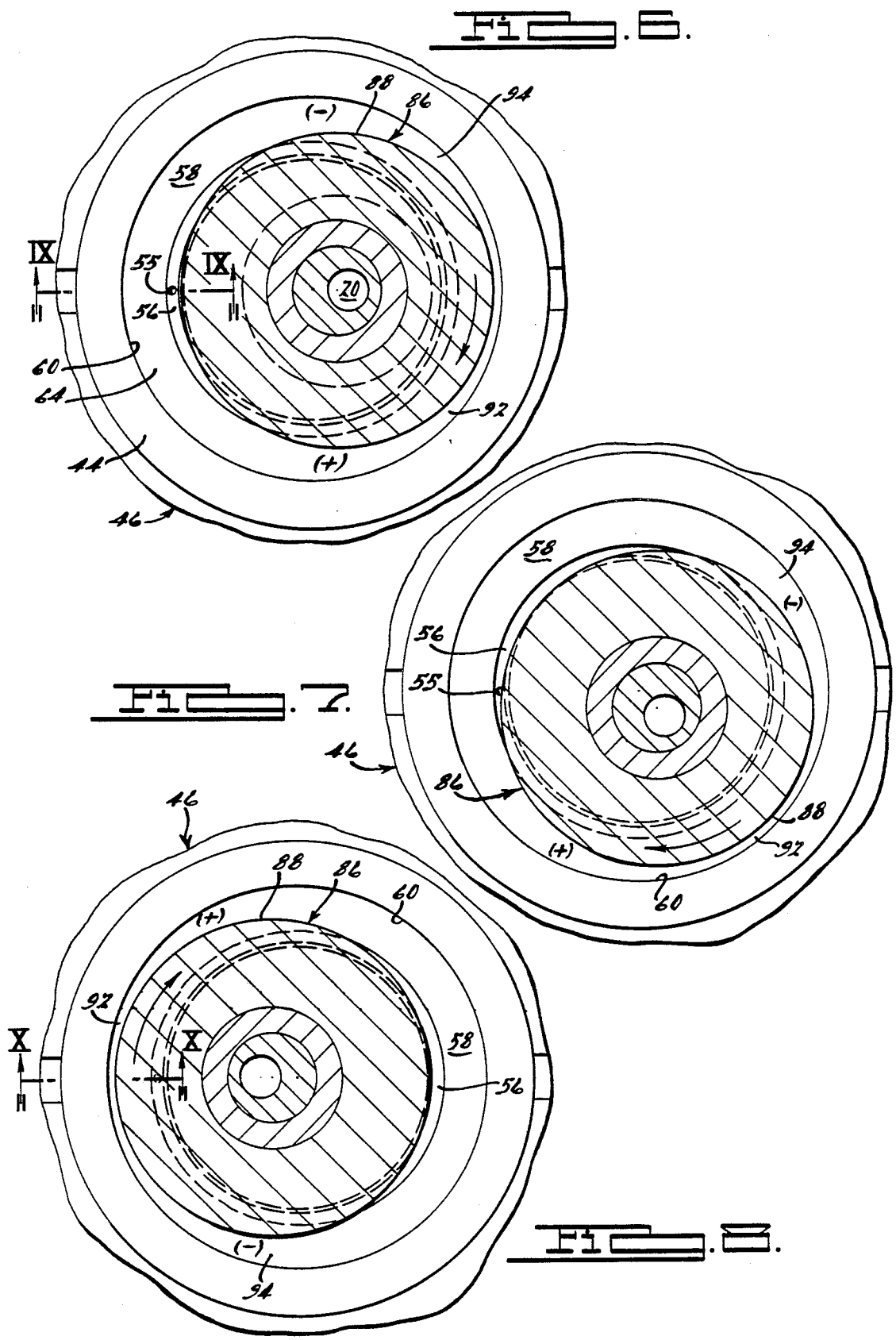

4,993,929

SCROLL MACHINE WITH LUBRICATED THRUST SURFACES

BACKGROUND AND SUMMARY OF THE INVENTION

This invention relates to a scroll compressor having thrust bearing surfaces, and more particularly to an arrangement for assuring that adequate lubricant is supplied to the bearing surfaces of such a machine.

A scroll-type compressor usually comprises a vertically extending shaft connected to a motor, orbiting and non-orbiting scroll members having interfitting spiral vanes for compressing a gas, the orbiting scroll being driven by the shaft and having a thrust bearing surface, and a bearing member having a generally flat bearing surface supporting the thrust bearing surface of the orbiting scroll for orbiting movement relative to the other scroll member. The crankshaft is journalled for rotation in one or more bearings and has a lower end portion immersed in a sump of lubricant. A pump pumps oil vertically upwardly through a central passage of the shaft from the sump to lubricate all of the bearings.

If the supply of lubricant is insufficient to completely fill the interface between the thrust bearing surfaces for the orbiting scroll member or if the load and speed of operation are not favorable to the generation of a complete fluid film, then lubrication may be incomplete and there could be areas between the thrust bearing surfaces which do not have the benefit of a fluid film to keep the surfaces apart. As loading increases, due to intertia and compressed gas forces, the forces on the bearing surfaces could become so high that it would be difficult for the pump to provide adequate lubrication to avoid damaging wear.

In accordance with this invention there is provided a self-pressurized fluid film hydrostatic bearing arrangement for a scroll apparatus which obviates the aforesaid problem which can occur under high load conditions, thereby increasing reliability and overall performance. The bearing of the present invention advantageously further increases lubricant pressure after it is introduced to the bearing surfaces, without costly provision of a conventional secondary pump. Normal operation of the orbiting scroll will advantageously utilize existing lubricant paths to increase pressure sufficiently to lift the orbiting scroll from engagement with its thrust bearing.

Other advantages and features will become apparent from the following specification taken in connection with the accompanying drawings.

BRIEF DESCRIPTION OF THE DRAWINGS

FIG. 1 is a partial cross-sectional vertical view of a scroll compressor embodying the principles of the present invention;

FIG. 2 is a cross-sectional view taken generally along line II—II in FIG. 1;

FIG. 3 is an enlarged fragmentary cross-sectional elevation view of the double-acting thrust bearing portion shown at III in FIG. 1;

FIGS. 4 and 5 are similar to FIG. 3 but show the thrust bearing in different position;

FIG. 6 is a cross-sectional view similar to FIG. 2, but showing a single-acting orbiting thrust bearing as an alternative embodiment of the present invention;

FIGS. 7 and 8 are views similar to FIG. 6 but showing the thrust bearing in different positions;

FIG. 9 is an enlarged fragmentary cross-sectional view taken generally along line IX—IX in FIG. 6; and FIG. 10 is an enlarged fragmentary cross-sectional view taken generally along line X—X in FIG. 8.

DESCRIPTION OF THE PREFERRED EMBODIMENT

Although the orbiting scroll drive assembly of the present invention is applicable to many different types of scroll machinery, it is illustrated for exemplary purposes embodied in a scroll compressor, and in particular a hermetic refrigerant compressor. The essential components of the machine are illustrated in FIG. 1, wherein there is shown a hermetic shell 10, a main bearing housing or member 12 secured to shell 10 by a weld 14, a bearing assembly 16 carried by member 12 and a crankshaft 18 journalled in the assembly. Crankshaft 18 has upper and lower end portions, a slightly inclined upwardly axially extending oil feed passageway 20 open at the upper end portion, and a radial oil feed passageway 22 for feeding lubricant to bearing 16 via a circumferential groove 23 in the bearing. Crankshaft 18 is affixed to a motor rotor 24 which is energized by the usual motor stator, the upper windings 26 of which are seen in FIG. 1. The upper end portion of crankshaft 18 comprises an eccentric crank pin 28 which drivingly engages an unloader drive bushing 30 rotatably journalled within a hub 32 descending from an orbiting scroll member 34.

Orbiting scroll member 34 includes an end plate 36 having generally flat upper and lower surfaces 38 and 40 and a spiral wrap 42, the wrap 42 extending upwardly from upper surface 38 and lower surface 40 slidably engaging a thrust bearing surface 44 on main bearing housing 12. A non-orbiting scroll member 46 includes an end plate (not shown) having a central discharge opening (not shown) and a spiral wrap 48 extending downwardly from the end plate, wrap 48 meshing with spiral wrap 42 of orbiting scroll member 34 in the usual manner. Refrigerant gases are compressed between the spiral wraps and discharged through the discharge opening. Relative rotational movement between the orbiting and non-orbiting scroll members is prevented by means of the usual Oldham coupling 50 disposed between orbiting scroll member 34 and bearing housing 12.

The orbiting drive mechanism is lubricated by means of a conventional oil pump located at the lower end of the crankshaft (not shown) in the usual oil sump (not shown) disposed in the closed bottom of the hermetic shell 10. Oil is pumped by that pump up passageway 20 to all the points requiring lubrication, with excess oil being pumped out of the upper open end of passage 20 generally across the upper end of crank pin 28 and drive bushing 30, which in turn allows oil to be returned to the sump through journal bearing 52 and between crank pin 28 and bushing 30.

Bearing assembly 16 includes a generally vertical groove 54 which passes oil from oil feed groove 23 into intersecting passages 53 and 55 which communicate with an annular groove 56 formed in thrust bearing surface 44, thereby providing a lubricated interface between bearing surface 44 and end plate 36 of the orbiting scroll. As described up to this point, the compressor, including the portions not shown, may be identical to that described in assignee's U.S. Letters Patent No. 4,767,293, issued Aug. 30, 1988, the disclosure of which is specifically incorporated herein by reference.

In accordance with the first embodiment of this invention (FIGS. 1-5), a cylindrical chamber 58 in the form of a shallow groove is formed in thrust bearing surface 44, chamber 58 being formed by a pair of cylindrical walls 60 and 62 generally concentric with the axis of shaft 18 and a second thrust bearing surface 64 onto which annular groove 56 opens to pass lubricant pumped by the pump through passage 20. Groove 56 is concentric with and approximately centered between walls 60 and 62. Bearing surface 64 is flat and generally parallel to surface 44. A cylindrical annular projection 66 depending from lower surface 40 of end plate 36 is received in chamber 58 to define a piston which orbits relative to bearing surface 64. Cylindrical piston 66 has a pair of generally concentric cylindrical walls 68 and 70 facing, respectively, radially outwardly and inwardly, and a thrust bearing surface 72 disposed in engaging relation to bearing surface 64. Cylindrical projection 66 is dimensioned to have a height closely equal to the depth defined by cylindrical wall 60 such that bearing surfaces 44 and 64 slidably engage thrust surface 40 and 72 to transmit the axial thrust on the orbiting scroll end plate to bearing member 12. Piston 66 divides chamber 58 into a pair of crescent-shaped compression chambers 74 (outer) and 76 (inner).

FIG. 2 shows orbiting scroll 34 orbiting in the clockwise direction relative to non-orbiting scroll 46. As scroll 34 orbits each part of piston 66 orbits in chamber 58 between superposing and nonsuperposing positions with respect to oil supply groove 56.

While the total volume of the chambers 74 and 76 remains constant, orbiting walls 68 and 70 of piston 66 define reducing and expanding pockets. The lubricant in pockets 78 and 80 adjacent to advancing walls 68 and 70 is compressed (shown by the "+") and in pockets 82 and 84 adjacent trailing walls 68 and 70 is expanded and reduced in pressure (shown by the "−"). The moving pockets 78 and 80 increase the pressure of the lubricant supplied by groove 56, the high pressure lubricant thereby lifting the orbiting scroll and maintaining the necessary oil film between the thrust surfaces. Lubricant is constantly supplied to groove 56 by the pump and the pressure of the lubricant so supplied is intensified by the oribting piston to force orbiting scroll 34 from engagement with bearing member 12. In effect, piston 66 and chamber 58 provide a second pump to further intensify the lubricant pressure to assure that lubrication is supplied at a location between the slidably engaging thrust surfaces.

FIGS. 6-10 illustrate an alternative single-acting arrangement for self-pressurizing the thrust bearing surfaces as scroll member 34 orbits relative to non-orbiting scroll member 46. As shown in FIGS. 6-9, a cylindrical projection 86 descends from surface 40 to define a shallow cylindrical piston which is received in chamber 58, the piston having a cylindrical wall 88 concentric with the axis of scroll 34 (i.e., the crank pin) and a driven thrust bearing surface 90 disposed in confronting relation to bearing surface 64 to take the axial thrust loads. Cylindrical walls 88 and 60, respectively, of piston 86 and bearing chamber 58 are dimensioned such that the piston surfaces 40 and 90 are slidably engaged on the respective bearing surfaces 44 and 64. Piston 86 and chamber 58 form a generally fixed volume for receiving lubricant from groove 56. Wall 88 of piston 86 is dimensioned to define a constantly moving pressurizable chamber that is pressurized by the piston orbiting in chamber 58. Piston 86 causes the lubricant immediately adjacent hub 82 in the direction of orbiting, designated 92, to be highly pressurized whereas lubricant in the region immediately following the hub, designated 94, to be at a lower pressure.

FIG. 6, 7 and 8 show the piston 86 orbiting between various positions in chamber 58, including (viewing the machine at the nine o'clock position of oil groove 56) a first position where the pistion is furthest away from wall 60, a second intermediate position where the pistion is nearly in superposing relation to oil groove 56, and a third position in which it is in superposing relation to groove 56 and at a minimum distance from wall 60. When piston 86 orbits, a portion of annular groove 56 is always left uncovered whereby the oil supplied from passage 55 will be free to fill the interface between the thrust surfaces. Rotation of the cylindrical piston develops a high pressure wave in chamber 58 and causes the oil from groove 56 to be highly pressurized in region 92, thereby causing orbiting scroll member 34 to be lifted vertically relative to the thrust surface. From this action, lubricating oil is forced from the sump into a location between the mating surfaces of the orbiting scroll and the bearing. Advantageously, such an arrangement provides a self-pressurizing action which takes advantage of the ordinary orbiting motion of scroll member 34 to eliminate the need for any separate pressurized oil system for thrust bearing lubrication.

As can now be appreciated, in FIGS. 1-5 there is illustrated a double-acting self-pressurizing thrust bearing arrangement according to the present invention, exemplified by the ring-like annular piston 66, whereas the arrangement shown in FIGS. 6-10 is a single-acting self-pressurizing thrust bearing arrangement, exemplified by the cylindrical pistion 86. The lubricant in chamber 58 forms a wave which pulls lubricant from groove 56, regardless of the direction of rotation of the crankshaft. It is of note the maximum load on the crankshaft follows the chamber location where the wave pressure is highest. This, advantageously, assures that unbalanced forces of compression do not result in a failure in fluid film lubrication between the orbiting scroll and bearing.

It should be noted that a simple reversal of parts is also possible. As disclosed, the piston is on the orbiting scroll and the pressurized chamber is on the thrust surface of the main bearing housing; however, these elements can be reversed so that the chamber is on the orbiting scroll and the piston is on the bearing housing.

It should also be observed that all regions of the pumping chamber communicate with each other so that as the oil pressure in one section tends to rise due to the scroll motion, the oil is forced to move around the long circumferential path into the low pressure section. To prevent this dissipative action from occurring the cylindrical walls 60 and 88 are made very small, on the order of 0.001 inch. With such a small vertical height to the pumping chamber, it is very difficult for the highly viscous oil to flow through the long circumferential path to relieve the pumping action of that portion of the chamber undergoing a closing action.

While it will be apparent that the preferred embodiments of the invention disclosed are well calculated to provide the advantages above stated, it will be appreciated that the invention is susceptible to modification, variation and change without departing from the proper scope or fair meaning of the subjoined claims.

What is claimed is:

1. In a hydrostatic thrust bearing for two engaged thrust surfaces wherein one of said surfaces orbits about an axis with respect to the other of said surfaces, the improvement comprising means on said thrust surfaces defining a pumping means for elavating the pressure of the lubricating oil supplied thereto to enhance lubrication of said bearing.

2. A thrust bearing as claimed in claim 1 wherein said pumping means comprises steps on said thrust surfaces which cooperate with one another to define a pumping chamber.

3. A thrust bearing as claimed in claim 2 wherein said step on one of said thrust surfaces is defined by a circular recess therein and said step on the other of said thrust surfaces is defined by a circular projection thereon.

4. A thrust bearing as claimed in claim 3 wherein the depth of said recess is the same as the height of said projection.

5. A thrust bearing as claimed in claim 2 wherein said step on one of said thrust surfaces is defined by a annular recess therein and said step on the other of said thrust surfaces is defined by an annular projection thereon.

6. A thrust bearing as claimed in claim 5 wherein the depth of said recess is the same as the height of said projection.

7. A scroll machine comprising two scroll plates with intermeshed involute wrap elements defining moving fluid pockets when at least one of the plates orbits about an axis relative to the other of said plates; a body member having a fixed generally flat first thrust surface for slidably supporting a second generally flat thrust surface on said one scroll plate during orbiting thereof to accommodate axial thrust loads created by fluid under pressure in said fluid pockets; a recess in one of said thrust surfaces defining a generally cylindrical first face; a projection on the other of said thrust surfaces defining a generally cylindrical second face, said cylindrical faces having axes parallel to said axis with one cylindrical face disposed within and opposing the other cylindrical face, whereby orbiting of said plate causes one of said cylindrical faces to orbit with respect to the other to create a fluid pumping chamber; and means for supplying lubricating oil to said chamber, said oil being pressurized by the pumping action of said cylindrical faces whereby it is forced into the interface between the engaged thrust surfaces.

8. A scroll machine as claimed in claim 7 wherein said second cylindrical face is defined by a projection on said one scroll plate and is smaller in diameter than said first cylindrical face.

9. A scroll machine as claimed in claim 8 wherein said oil supplying means comprises an annular groove in said recess.

10. A scroll machine as claimed in claim 9 wherein said groove is generally coaxial with said first cylindrical face and is spaced inwardly therefrom a distance such that it is fully traversed in both directions by said second cylindrical face as the latter orbits.

11. A scroll machine as claimed in claim 7 wherein the bottom surface of said chamber defines a third thrust surface which engages the end of said projection.

12. A scroll machine as claimed in claim 7 wherein said cylindrical faces are of right circular cylindrical configuration substantially equal in axial length.

13. A scroll machine as claimed in claim 12 said cylindrical faces are substantially equal in axial length.

14. A scroll machine as claimed in claim 7 wherein said oil supplying means comprises an annular groove in one of said thrust surfaces.

15. A scroll machine as claimed in claim 1 wherein said recess is annular in configuration defining a third cylindrical face in addition to said first cylindrical face, and wherein said projection is annular in configuration defining a fourth cylindrical face in addition to said second cylindrical face, said annular projection being disposed within said annular recess whereby said third and fourth cylindrical faces define a pumping chamber for forcing oil into the interface between said engaging thrust surfaces.

16. A scroll machine as claimed in claim 15 wherein said oil supplying means comprises an annular groove disposed in said recess.

17. A scroll machine as claimed in claim 15 wherein said cylindrical faces are of right circular cylindrical configuration.

18. A scroll machine as claimed in claim 15 wherein the bottom surface of said recess and the end surface of said projection slidably engage one another to accommodate thrust loads created by fluid pressure in said fluid pockets.

19. A thrust bearing as claimed in claim 7 wherein said fluid pumping chamber is generally annular in configuration with the axial height thereof being sufficiently small that, there is insufficient dissipation of oil pressure due to oil flowing immediately from the high pressure region to the low pressure region.

20. A thrust bearing as claimed in claim 19 wherein said height is less than or equal to approximately 0.001 inches.

* * * * *

UNITED STATES PATENT AND TRADEMARK OFFICE
CERTIFICATE OF CORRECTION

PATENT NO. : 4,993,929
DATED : February 19, 1991
INVENTOR(S) : Roger C. Weatherston It is certified that error appears in the above-identified patent and that said Letters Patent is hereby corrected as shown below:

Column 3, line 45, "oribting" should be -- orbiting --.

Column 4, line 1, "pistion" should be -- piston --.

Column 4, line 7, "FIG." should be -- FIGS. --.

Column 4, line 10, "pistion" should be -- piston --.

Column 4, lines 11 and 12, "pistion" should be -- piston --.

Column 4, line 36, "pistion" should be -- piston --.

Column 5, line 6, "elavating" should be -- elevating --.

Column 5, line 22, "a" should be -- an --.

Column 6, line 17, after "12" insert -- wherein --.

Column 6, line 22, "1" should be -- 7 --.

Signed and Sealed this

Eighth Day of September, 1992

Attest:

DOUGLAS B. COMER

Attesting Officer

Acting Commissioner of Patents and Trademarks